United States Patent [19]
Oone et al.

[11] Patent Number: 5,866,970
[45] Date of Patent: *Feb. 2, 1999

[54] VIBRATION ACTUATOR

[75] Inventors: Kazuyasu Oone, Urawa; Mina Kobayashi, Yokohama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 781,054

[22] Filed: Jan. 9, 1997

[30] Foreign Application Priority Data

| Jan. 9, 1996 | [JP] | Japan | 8-001450 |
| Oct. 25, 1996 | [JP] | Japan | 8-284297 |
| Nov. 29, 1996 | [JP] | Japan | 8-320189 |

[51] Int. Cl.$^6$ ............................................. H01L 41/08
[52] U.S. Cl. .......................................................... 310/323
[58] Field of Search ................................... 310/323, 328

[56] References Cited

U.S. PATENT DOCUMENTS

| 4,812,697 | 3/1989 | Mishiro | 310/323 |
| 4,893,045 | 1/1990 | Honda | 310/323 |
| 4,956,482 | 9/1990 | Ohnishi et al. | 310/323 |
| 5,028,832 | 7/1991 | Iwao et al. | 310/323 |
| 5,039,899 | 8/1991 | Yamaguchi | 310/323 |
| 5,101,132 | 3/1992 | Yamaguchi | 310/323 |
| 5,124,611 | 6/1992 | Tamai et al. | 310/317 |
| 5,136,200 | 8/1992 | Takizawa et al. | 310/323 |
| 5,140,215 | 8/1992 | Yamaguchi | 310/323 |
| 5,191,688 | 3/1993 | Takizawa et al. | 29/25.35 |
| 5,200,665 | 4/1993 | Iijima | 310/323 |
| 5,216,313 | 6/1993 | Ohnishi et al. | 310/323 |
| 5,245,243 | 9/1993 | Ohnishi et al. | 310/323 |
| 5,357,164 | 10/1994 | Imabayashi et al. | 310/323 |
| 5,416,375 | 5/1995 | Funakubo et al. | 310/323 |
| 5,472,662 | 12/1995 | Yano et al. | 310/328 X |
| 5,698,930 | 12/1997 | Takagi | 310/323 |
| 5,723,935 | 3/1998 | Tomikawa et al. | 310/323 |

FOREIGN PATENT DOCUMENTS

| 0-674 350 A1 | 9/1995 | European Pat. Off. |
| 069 072 A1 | 2/1996 | European Pat. Off. |
| 2-13279 | 1/1990 | Japan |
| 7-143771 | 6/1995 | Japan |
| 8-103089 | 4/1996 | Japan |
| 8-140377 | 5/1996 | Japan |
| 8-242593 | 9/1996 | Japan |

OTHER PUBLICATIONS

S. Ueha and Y. Tomikawa, ULTRASONIC MOTORS THEORY AND APPLICATIONS, Clarendon Press –)xford, 1993, pp. 131–196.

Ultrasonic Motors, Theory and Applications, S. Ueha, Y. Tomikawa, M. Kurosawa, N. Nakarmura, Clarendon Press, Oxford, 1993, all pages.

"Piezoelectric Linear Motors For Application to Driving a Light Pick–Up Element" (Yoshiro Tomikawa et al., 5th Symposium on Dynamics Relating to Magnetic Force, Collected Papers, 06/09–Nov. 1993, pp. 393–398.

*Primary Examiner*—Mark O. Budd

[57] ABSTRACT

A vibrator actuator provides a drive force by vibrating a vibration element in response to an input signal. The vibration element includes a piezoelectric element which imparts vibration to the vibration element in response to an electrical signal. The vibration element is in compressive contact with and moves with respect to a relative moving member. The relative moving member may be planar, circular or toroidal. The relative moving member has first and second surfaces with said first surface being an adherent material removal surface. The adherent material removal surface removes wear particles which become adhered to the vibration element and the relative moving member. The relative moving member may have a number of first and second alternating surfaces to increase effectiveness. The second surfaces may be non-perpendicular with respect to a movement trajectory of the vibration element to decrease resistance during contact with the vibration element.

12 Claims, 11 Drawing Sheets

VIBRATION ACTUATOR

CROSS REFERENCE TO RELATED APPLICATIONS

This application is based upon and claims priority of Japanese Patent Applications No. 08-001450 filed Jan. 9, 1996, No. 08-284297 filed Oct. 25, 1996, and No. 08-320189 filed Nov. 29, 1996, the contents being incorporated herein by reference.

BACKGROUND OF THE INVENTION

The present invention relates to a vibration actuator, and more particularly to a vibration element which moves in relation to and is in compressive contact with a relative moving member.

As prior art technology, for example, a longitudinal-bending type of vibration actuator is known in which a drive force is obtained by causing longitudinal vibrations and bending vibrations to arise harmonically in an elastic member.

Figure 12:
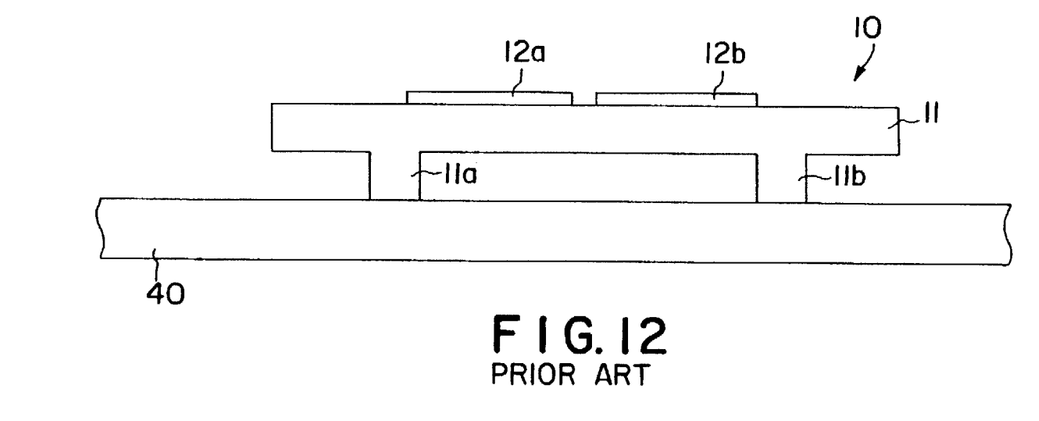
FIG. 12 (PRIOR ART) is a front view of a prior longitudinal-bending type vibration actuator.

FIG. 12 (PRIOR ART) is a front view of a prior art longitudinal-bending vibration actuator. As illustrated in FIG. 12, vibration element 10 includes an elastic member 11 which is designed in a rectangular flat plate form. Elastic member 11 is designed to have a resonance frequency value which is very close to a resonant frequency of a first order longitudinal vibration and a fourth order bending vibration (or eighth order bending vibration). As illustrated, two electro-mechanical conversion elements 12a, 12b (piezoelectric elements) are affixed to the same side surface of elastic member 11.

Two alternating voltages which differ in phase and have respective frequencies close to the above resonant frequencies are impressed on the piezoelectric elements 12a, 12b in vibration element 10. Accordingly, two harmonized vibrations are generated in elastic member 11.

Driving force output members 11a, 11b are formed in a projecting shape from portions of elastic member 11 and become anti-nodes of the fourth order bending vibration. The fourth order bending vibration arises in the flat, opposite, side surface of elastic member 11. The tips of driving force output members 11a, 11b are periodically displaced in elliptic form. Accordingly, the compressive contact of the tips of driving force output members 11a, 11b output a driving force to relative moving member 40.

If relative moving member 40 is fixed, vibration element 10 propels itself in a trajectory in a right-hand direction or a left-hand direction in relation to relative moving member 40. Moreover, in the case that vibration element 10 is fixed, relative moving member 40 becomes a driven object and accordingly is driven right or left with respect to vibration element 10.

In order for the sliding resistance between the contact surface of relative moving member 40 and driving force output members 11a, 11b to be low, a sliding material (not shown in the drawing) is affixed to relative moving member 40 by way of adhesive or the like. Moreover, a mirror surface lapping process is generally performed on the sliding surfaces of driving force output members 11a, 11b and relative moving member 40 in order, similarly, to reduce the sliding resistance.

However, in the prior art vibration actuators, "wear particles" appears after the vibration actuators are driven for a long period of time. These wear particles result from sliding, and adheres to the contact surfaces of elastic member 11 and relative moving member 40. The adhesion of the wear particles has the effect of reducing the drive force. Accordingly, a stabilized drive may only be performed for a relatively short period time.

Moreover, during reciprocating motion of vibration element 10, wear particles become marked at the reversal positions and the positions nearly adjacent to the reversal positions along the sliding surface of relative moving member 40. Thus, another problem is that movement of vibration element 10 may become reduced at either of the reversal positions. In the case of a fixed vibration element, relative moving member 40 similarly performs a reciprocating motion, and wear particles are markedly deposited at the reversal positions along relative moving member 40. In a worst case scenario, relative moving member 40 is stopped at one of the reversal positions.

Furthermore, when a mirror surface is used for relative moving member 40 and a lapping process (polishing process) is carried out on the sliding surface of relative moving member 40, there is a problem that wear particles tend to enter very fine scratches in the mirror lapped surface and adheres therein.

BRIEF SUMMARY OF THE INVENTION

It is therefore an object of the present invention to provide a vibration actuator which can efficiently perform stabilized driving for a long period of time.

It is a further object of the present invention to provide an adherent material elimination region which eliminates adherent material which has become adhered to contact surfaces of a vibration actuator.

Furthermore, it is an object of the present invention to form an adherent material elimination region of a vibration actuator by sand polishing.

It is still a further object of the present invention to make reversal points of a reciprocating vibration member variable to thereby increase the useful life of a vibration actuator.

Objects of the invention are achieved by a vibration actuator, comprising: a vibration element which vibrates in response to an input signal; and relative moving member being in compresssive contact with the vibration element and moving relative to the vibration element by a vibration generated in the vibration element, the relative moving member having a first surface and a second surface which differs in state from the first surface to remove an adherent material from the surface of the vibration element, wherein a drive surface of the vibration element contacts the first surface and the second surface successively during relative movement.

Moreover, objects of the invention are further achieved by a vibration actuator wherein a relative moving member has a third surface having a same state as a second surface with a first surface disposed between the second and third surfaces; and the vibration element moves in a reciprocating motion between the second and third surfaces or a pair of variable reversal positions of the relative moving member.

Furthermore, objects of the invention are achieved by a vibration actuator comprising: a vibration element which vibrates in response to an input voltage and includes a drive surface; and a relative moving member being in compressive contact with the vibration element and moving relative to the vibration element by vibration generated in the vibration element, the drive surface of the vibration element having a first surface and a second surface which differs in state from the first surface to remove an adherent material from the surface of the relative moving member, wherein part of the relative moving member contacts the first surface and the second surface successively during relative movement.

Objects of the invention are also achieved by a vibration actuator having a vibration element which comprises first and second elastic members shaped as a cylindrical tubular body cut by a first division plane through its longitudinal axis of symmetry, with each elastic member having a respective drive surface, and an electro-mechanical conversion element sandwiched between the first and second elastic members; and the first surface and the second surface are disposed on the drive surface of the first elastic member.

Moreover, objects of the invention are achieved by a vibration actuator comprising: an elastic member having a first planar side, a second planar side and a driving force output portion disposed on the second planar side; an electro-mechanical conversion element attached to the first planar side of the elastic member and inducing vibration in the elastic member; and a relative moving member in compressive contact with the driving force output portion, the relative moving member including: a first surface, and a second surface connected to the first surface and differing in state from the first surface for removing an adherent material from the surface of the vibration element, wherein the driving force output portion moves from the first surface to the second surface while maintaining contact with the relative moving member.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

In the embodiments described hereinbelow, functions which are similar to those of the prior art example are given the same reference symbols, and duplicate descriptions are suitably omitted. Moreover, according to the following embodiments, the term ultrasonic actuator is considered an example of a vibration actuator using ultrasonic waves.

Figure 1A:
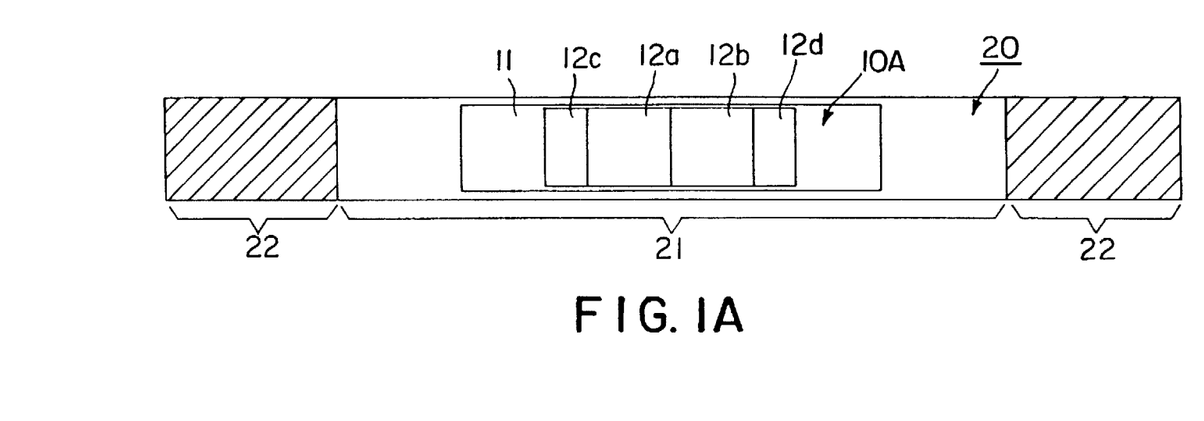
FIG. 1A is a plan view of a vibration actuator according to a first preferred embodiment of the present invention.
Figure 1B:
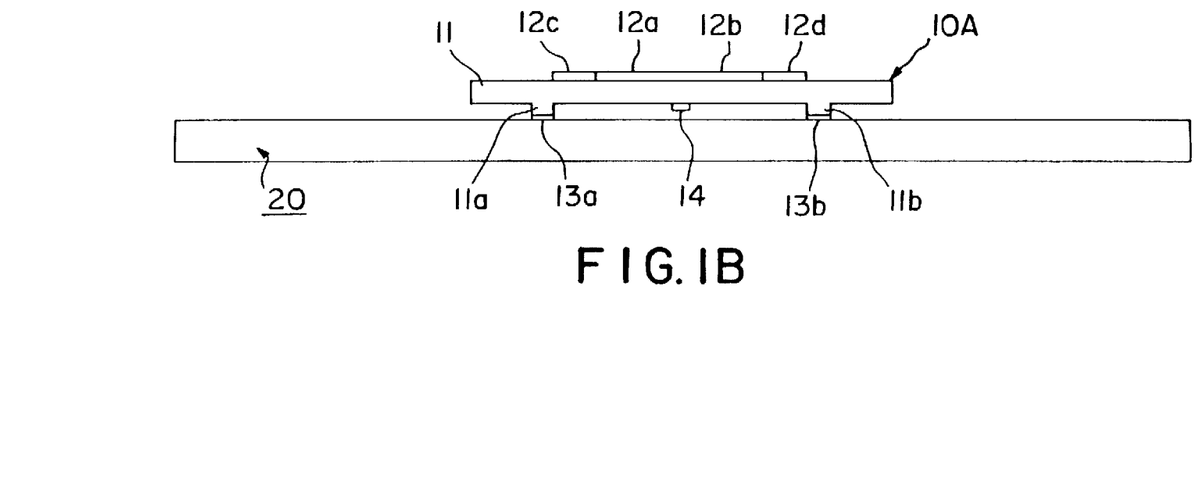
FIG. 1B is a front view of the vibration actuator of FIG. 1A.

FIG. 1A and FIG. 1B illustrate a vibration actuator according to a first preferred embodiment of the present invention. The vibration actuator harmonically generates first order longitudinal vibration and fourth order bending vibration and, by way of a degeneracy in the vibrations, provides a driving force from a predetermined position. The vibration actuator is equipped with vibration element 10A and relative moving member 20.

Vibration element 10A has an elastic member 11 and four piezoelectric elements 12a–12d which have been united to the same flat side thereof.

Piezoelectric elements 12a, 12b generate longitudinal-bending vibrations in elastic member 11 by way of a piezoelectric effect (an effect of second order). Piezoelectric elements 12c, 12d are used to monitor the state of vibration generated in elastic member 11 The output from piezoelectric elements 12c, 12d is connected to a control circuit (not shown). Electrode 14 is adhered to elastic member 11 and becomes a ground line (GND) along a central portion of vibration element 10A.

Vibration element 10A generates a first order longitudinal vibration and a fourth order bending vibration in elastic body 11 in response to alternating voltages which differ in phase by 90°. Driving force output members 11a, 11b are formed in a projecting shape on a portion which becomes an anti-node of the fourth order bending vibration arising on the flat surface of elastic member 11. Driving force is generated by the tips of driving force output members 11a, 11b, which perform an elliptic motion. Vibration element 10A can then propel itself in a rectilinear trajectory in relation to relative moving member 20. Sliding members 13a, 13b are affixed to the tips of the driving force output members 11a, 11b.

According to the first preferred embodiment, relative moving member 20 has a mirror finish portion ("mirror portion") 21. On the other hand, a portion finished with high surface roughness ("high surface roughness portion") 22 is formed on opposite sides of mirror portion 21. By the passage of vibration element 10A through high surface roughness portion 22, wear particles which have adhered to sliding members 13a, 13b are eliminated.

One characterizing feature of relative moving member 20, according to the first preferred embodiment, is that high surface roughness portion 22 is located on both sides of mirror portion 21, on which vibration element 10A propels itself in a rectilinear trajectory. Accordingly, vibration element 10A travels along mirror portion 21 with a normal travel time without an impediment to driving. On the other hand, in the side locations where vibration element 10A stops and reverses, vibration element 10A passes over high surface roughness portions 22 such that wear particles and the like are eliminated by becoming trapped.

FIGS. 2A–E illustrate a deformation mode of relative moving member 20, which constitutes a vibration actuator according to the first preferred embodiment of the present invention.

Figure 2A:
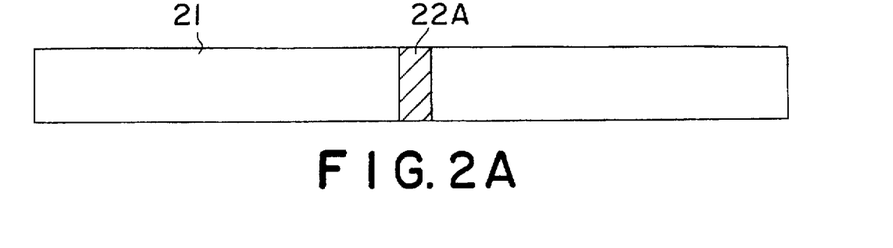
FIGS. 2A–E illustrate high surface roughness portions of a relative moving member according the first preferred embodiment of the present invention.
Figure 2B:
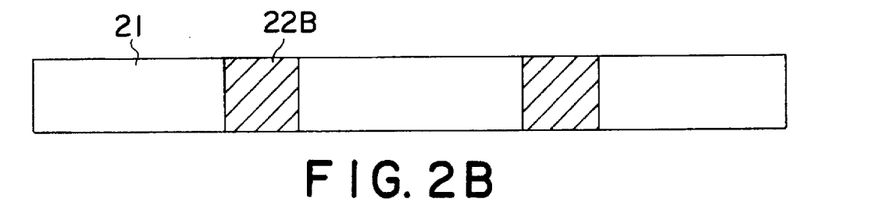
Figure 2C:
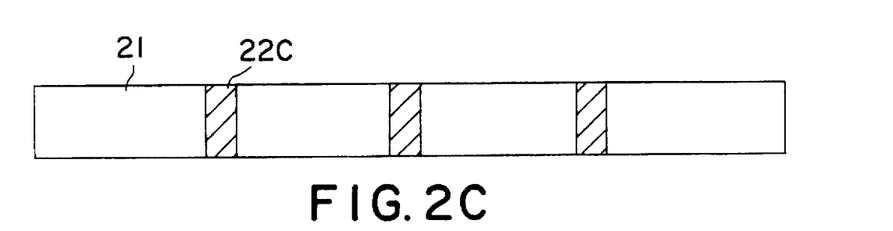

In the embodiment of FIGS. 1A and 1B, high surface roughness portion 22 has been disposed at both ends of mirror portion 21. However, as illustrated by FIG. 2A, the high surface roughness portion may be centered as high surface roughness portion 22a; the roughness portion may occupy two positions illustrated in FIG. 2B as high surface roughness portions 22b; otherwise, the roughness portion may occupy three or four positions, with the embodiment of three positions as illustrated in FIG. 2C as high surface roughness portions 22c. Moreover, if the roughness portions 22 are set in plural places, it is preferable that they are disposed at a pitch, in other words non-perpendicular, with respect to the trajectory of relative movement. According to this configuration, driving force output members 11a, 11b of vibration element 10A do not simultaneously ride on the high surface roughness portions 22.

Figure 2D:
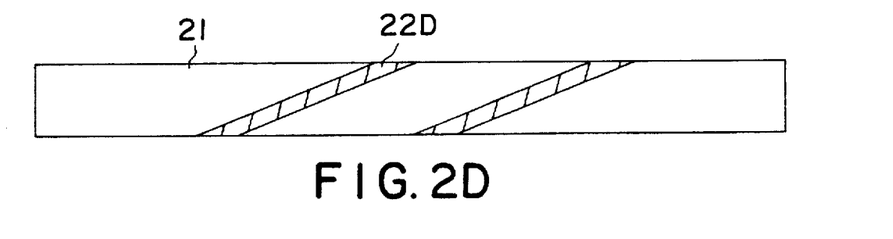
Figure 2E:
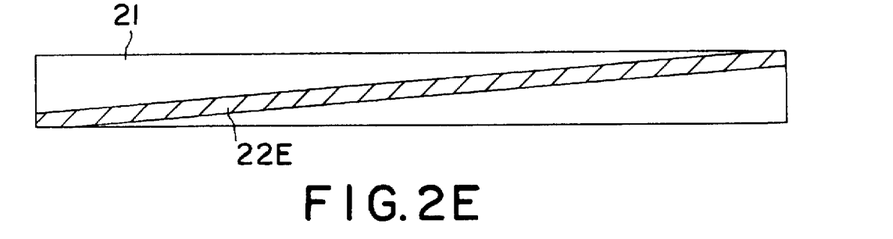

Furthermore, mirror portions 21, as illustrated in FIG. 2D and FIG. 2E, and high surface roughness portions 22d and 22e may respectively be arranged to face obliquely with respect to the trajectory of relative moving member 20. By way of such an arrangement, the tips of driving force output members 11a, 11b of vibration element 10A are disengaged from wholly riding on high surface roughness portions 22. Thus, regions of reduced driving efficiency, i.e. the high surface roughness portions, are disengaged from simultaneous contact with driving force output members 11a, 11b.

Moreover, high surface roughness portions 22 may be formed by adhering lapping paper and the like, such that a difference in level from mirror portion 21 does not arise.

Figure 3A:
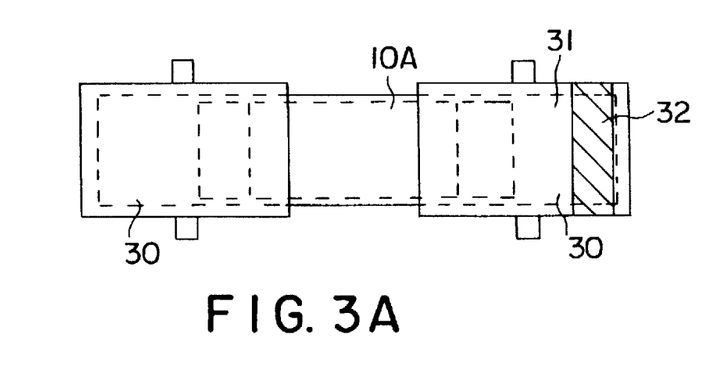
FIG. 3A is a plan view of a vibration actuator according to a second preferred embodiment of the present invention.
Figure 3B:
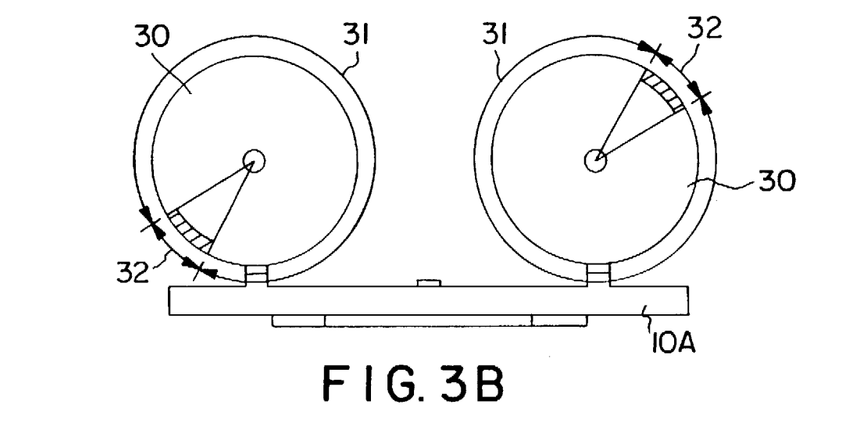
FIG. 3B a front view of the vibration actuator of FIG. 3A.

FIGS. 3A and 3B illustrate a second preferred embodiment of a vibration actuator according to the present invention. The second preferred embodiment illustrates a case in which vibration element 10A is not self propelled, but rather drives a pair of rollers in the form of relative moving members 30.

In each relative moving member 30, high surface roughness portion 32 is formed in a position which is determined about a circular circumference. High surface roughness portion 32 connects on both sides to mirror surface portion 31. Thus for each revolution, high surface roughness portion 32 and minor surface portion 31 pass over driving force output members 11a, 11b of vibration element 10A.

Moreover, in each relative moving member 30, it is also possible to form high surface roughness portion 32 in various configurations, as illustrated in FIGS. 2A–2E. Relative moving member 30 is not necessarily limited to a roller form but may be of different revolving forms as relative moving member 30 is able to move relatively to vibration element 10A.

Figure 4:
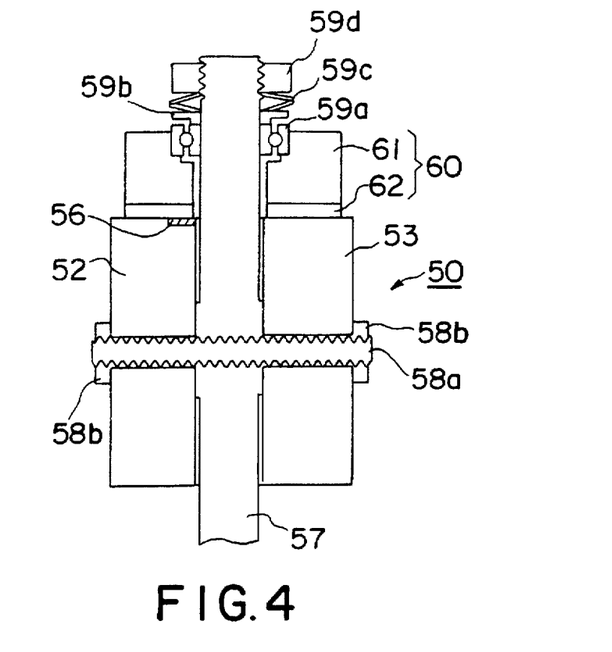
FIG. 4 illustrates a vibration actuator according to a third preferred embodiment of the present invention.
Figure 5:
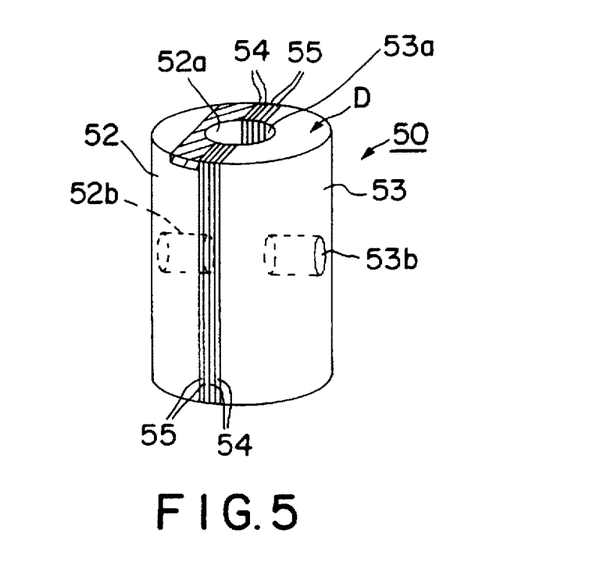
FIG. 5 is an elevated perspective view of the vibration actuator of FIG. 4.
Figure 6A:
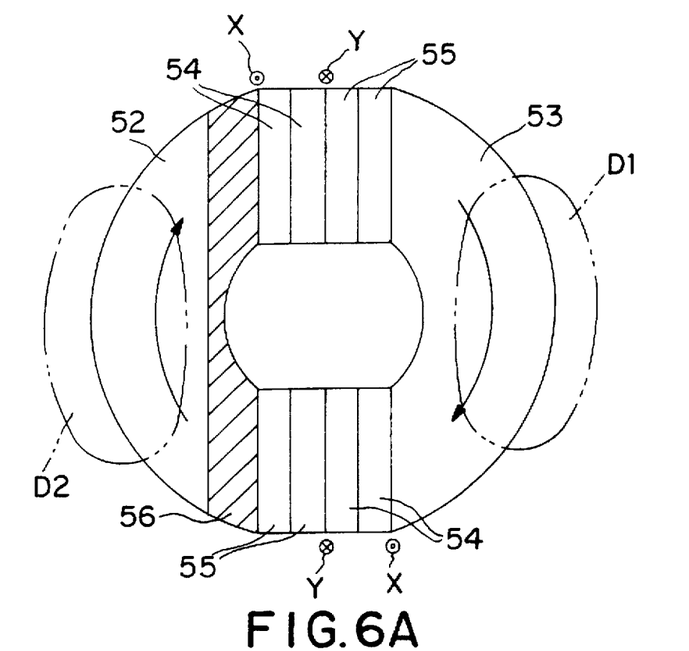
FIG. 6A is a sectional view of the vibration actuator of FIG. 4.
Figure 6B:
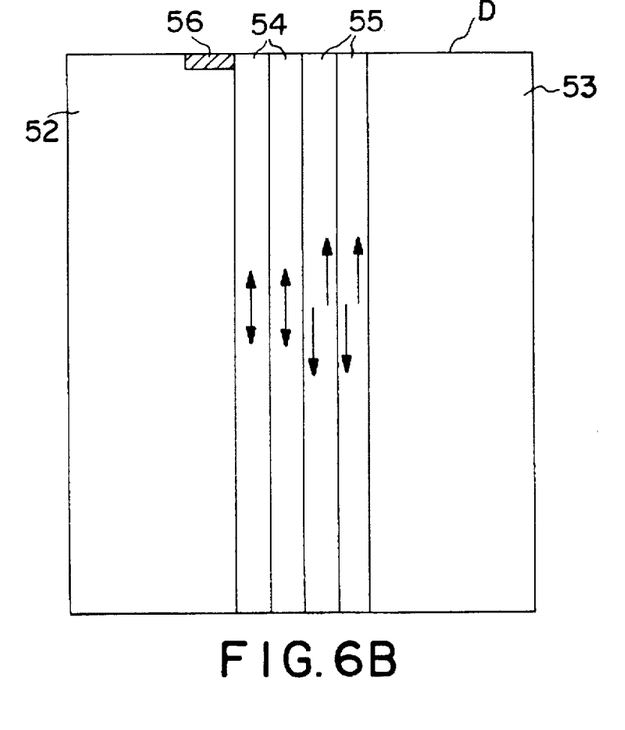
FIG. 6B is another sectional view of the vibration actuator of FIG. 4.

FIG. 4 is a cross sectional view of a third preferred embodiment of a vibration actuator according to the present invention. FIG. 5 is an elevated perspective view of the vibration actuator of FIG. 4. Furthermore, FIGS. 6A and 6B illustrate diagrams of the vibration element extracted from the vibration actuator of FIG. 5, As illustrated, vibration element 50 is equipped with elastic members 52, 53 and piezoelectric elements 54 and 55. Elastic members 52, 53 are members formed from a thick cylindrical tubular body which has been divided longitudinally in two along a division plane. Piezoelectric elements 54, 55 are sandwiched between elastic member 52 and 53 along the division plane.

Piezoelectric elements 54, 55 are excited by way of drive signals. Piezoelectric elements 54, 55 generate a first order longitudinal vibration and a first order torsional vibration in the elastic members 52, 53, such that a driving force is generated in drive surfaces D of elastic members 52, 53.

Piezoelectric elements 54, 55 have a total of four layers. Piezoelectric element 54, having two layers of the four layers, is a piezoelectric element for torsional vibration using the piezoelectric constant $d_{15}$. On the other hand, piezoelectric element 55 has the two remaining layers and is a piezoelectric element for longitudinal vibration using the piezoelectric constant $d_{31}$.

Elastic members 52, 53, as shown in FIG. 5, have through holes 52b, 53b which are formed parallel to the lamination direction of the piezoelectric elements 54, 55, and in an approximate longitudinal center of elastic members 52, 53. By tightening nuts 58b on bolt 58a, which passes through holes 52b, 53b, elastic members 52, 53 fix piezoelectric elements 54, 55 in a sandwiched state. Moreover, bolt 58a is fixed by way of screws retained in fixed shaft 57. Fixed shaft 57 has been inserted into the center of the longitudinal direction of elastic members 52, 53.

Relative moving member 60 includes moving element base material 61 and sliding material 62. Sliding material 62 contacts drive surface D of vibration element 50. Sliding material D is adhered to one end face of moving element base material 61. Relative moving member 60 determines a position with respect to fixed shaft 57 by way of a bearing and the like. Position determining member 59a is fitted into the interior of moving element base material 61.

Relative moving member 60 is in compressive contact with drive surface D of vibration element 50 by way of conical disc spring 59c. Conical disc spring 59c is a compression member. However, the compressive member can be a coil spring, plate spring, or the like.

Fixed shaft 57 passes through respective hollow portions 52a, 53a formed in the longitudinal direction of elastic members 52, 53. Fixed shaft 57 fixes vibration element 50, including elastic members 52, 53, and the like, and determines the position of relative moving member 60 in the radial direction. Fixed shaft 57 is formed with a spring portion adjacent to its end portion. Nut 59d is a compressive force adjustment member and adjusts the compressive force of conical disc spring 59c.

It is desirable to locate lapping member 56, as illustrated in FIGS. 6A and 6B. Lapping member 56 is located in positions outside of the drive regions D1, D2, which effectively contribute to the drive, to suppress a reduction in efficiency as far as possible. Values X and Y indicate directions of shear displacement.

Figure 7:
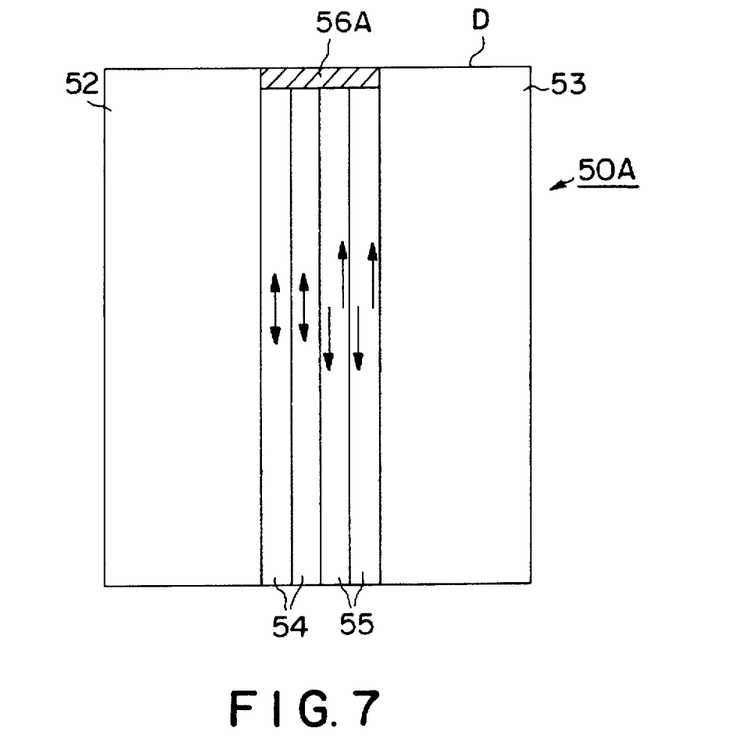
FIG. 7 illustrates displacement of a vibration element according to the third preferred embodiment of the present invention.

FIG. 7 illustrates a third preferred embodiment of a vibration actuator according to the present invention. In the third preferred embodiment of the present invention, a vibration element 50A has a lapping member 56A which is a high surface roughness portion. Lapping member 56A approaches the center of drive surface D of elastic member 52. Lapping member 56A is formed along drive surface D. Lapping member 56A laps the surface of sliding material 62 (FIG. 4), and thereby eliminates adherence between the materials.

In a fourth preferred embodiment of the vibration actuator according to the present invention, the vibration actuator has the high surface roughness portion 22 of FIG. 1 formed by performing wet polishing using a sand, such as green silicon carbide, GC#800, abrasive grain diameter 1.40 μm, made by Fujimi Inc., and a surface plate made of cast iron. The center line average roughness of high surface roughness portion 22 is 0.16 μm.

It has been confirmed that wear particles which adhere or stick to sliding members 13a, 13b affixed to driving force output members 11a, 11b, or the wear particles which were trapped by way of sliding members 13a, 13b which were mounted on the sliding surface of relative moving member 20, were trapped by passing over high surface roughness portion 22.

Furthermore, high surface roughness portions 22A–22E illustrated in FIG. 2, high surface roughness portion 32 in FIG. 3, and high surface roughness portion (lapping member) 56 in FIGS. 4–7, were all formed similarly. As a result, it was confirmed that the wear particles formed during driving were scraped out.

In a preferred embodiment of a vibration actuator according to the invention, as illustrated in FIGS. 8A–11B, the vibration actuator has photocouplers 70a, 70b, 70c, 70d located at both end sides of relative moving member 20, in two steps of pitch L1 and L2, or one step of pitch L1. Then, each time vibration element 10A moves along relative moving member 20, screening out the output light from the photocouplers 70a–70d, vibration element 10A uses the conversion circuit and, continuously operating the vibration actuator, measures the drive time until it stops.

Figure 8A:
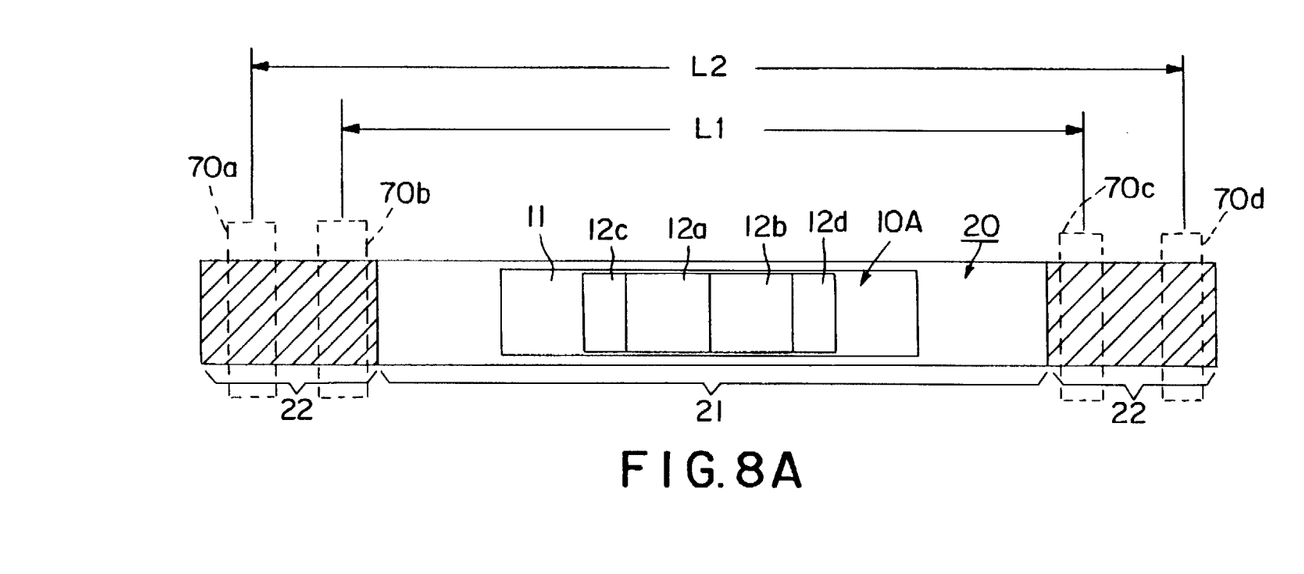
FIG. 8A is a plan view of a vibration actuator according to a fifth preferred embodiment of the present invention.
Figure 8B:
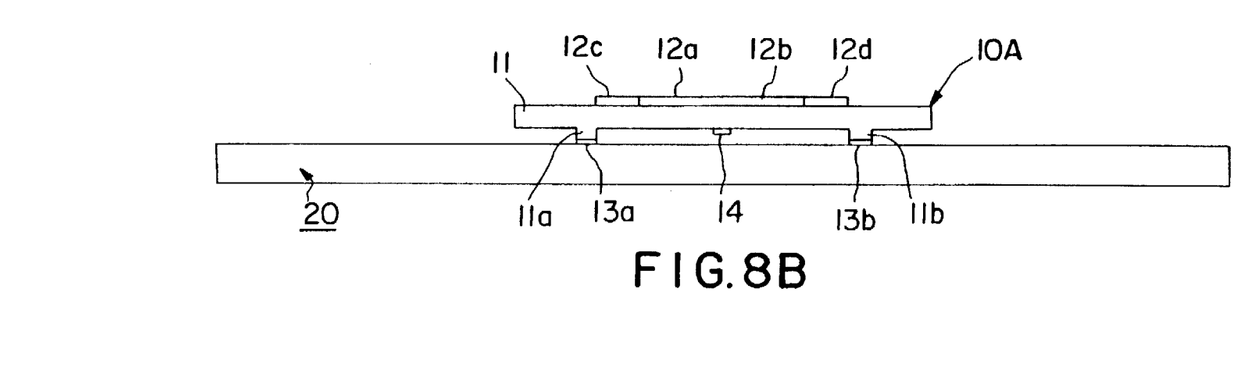
FIG. 8B is a front view of the vibration actuator of FIG. 8A.
Figure 9A:
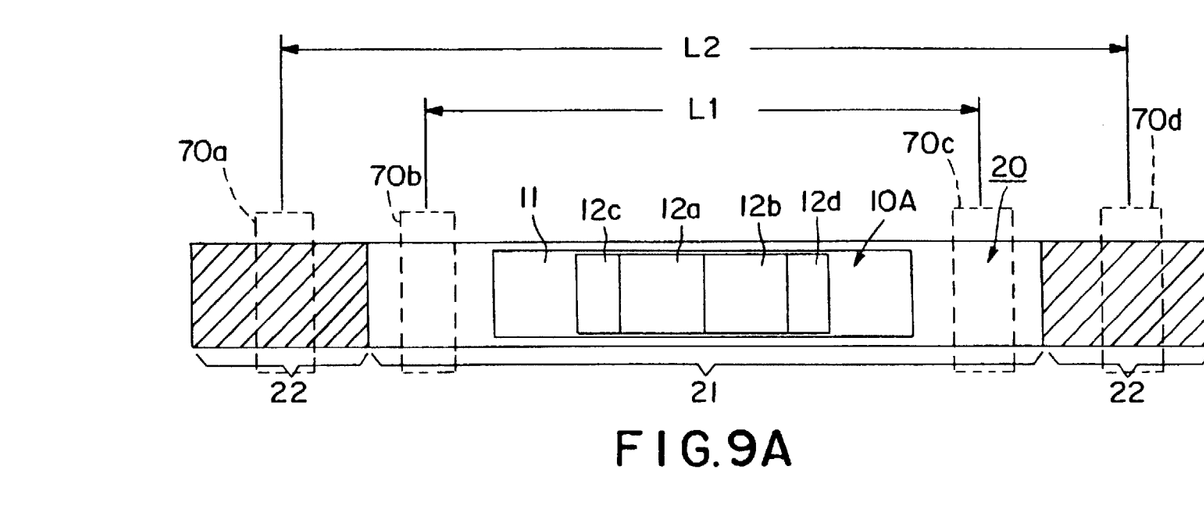
FIG. 9A is a plan view of a vibration actuator according to the fifth preferred embodiment of the present invention.
Figure 9B:
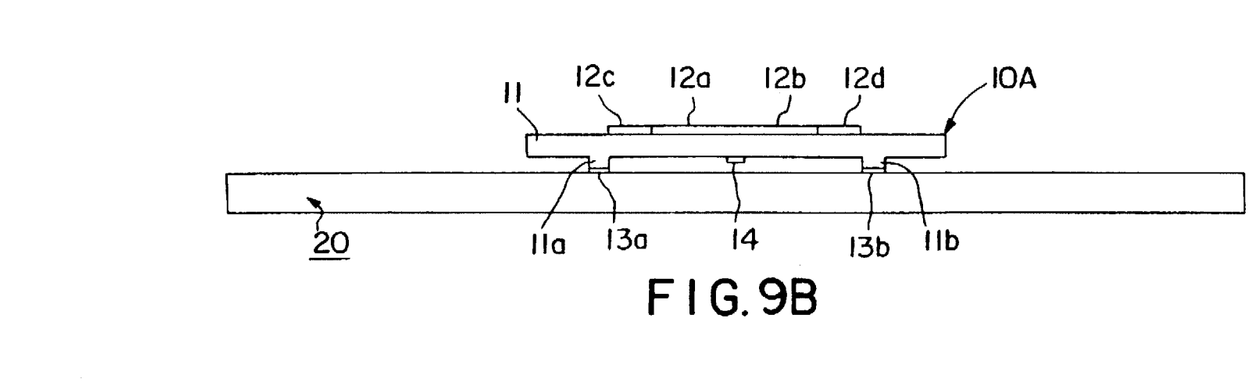
FIG. 9B is a front view of the vibration actuator of FIG. 9A.

FIGS. 8A, 8B and FIGS. 9A, 9B, are respective examples of a vibration actuator of the present invention equipped with high surface roughness portions on both end sides of relative moving member 20. In the example of FIGS. 8A, 8B, two of the photocouplers 70a–70d are respectively arranged on each of the two end sides in the locations where the high surface roughness portions 22 are made. In the example of FIGS. 9A, 9B, the two outside photocouplers 70a, 70d are arranged in locations where the high surface roughness portions 22 are made, and the two inside photocouplers 70b, 70c are arranged in positions where the mirror surface portions 21 are made.

On the other hand, FIGS. 10A, 10B and FIGS. 11A, 11B, are comparison examples in which high surface roughness portions are not used on relative moving member 20.

In examples of the vibration actuators of FIGS. 8A, 8B, 9A, 9B, 10A, 10B, and 11A, 11B of the present invention, sliding members 13a, 13b are made of a composite material which comprises fluororesin. According to a preferred embodiment of the present invention, the composite material is made from Polyfron which is sold by Daikin Industries Ltd. Polyfron comprises PTFE (polytetrafluoroethylene) of 80 wt. %, glass fiber of 15 wt. %, and molybdenum disulfide of 5 wt. %.

Figure 10A:
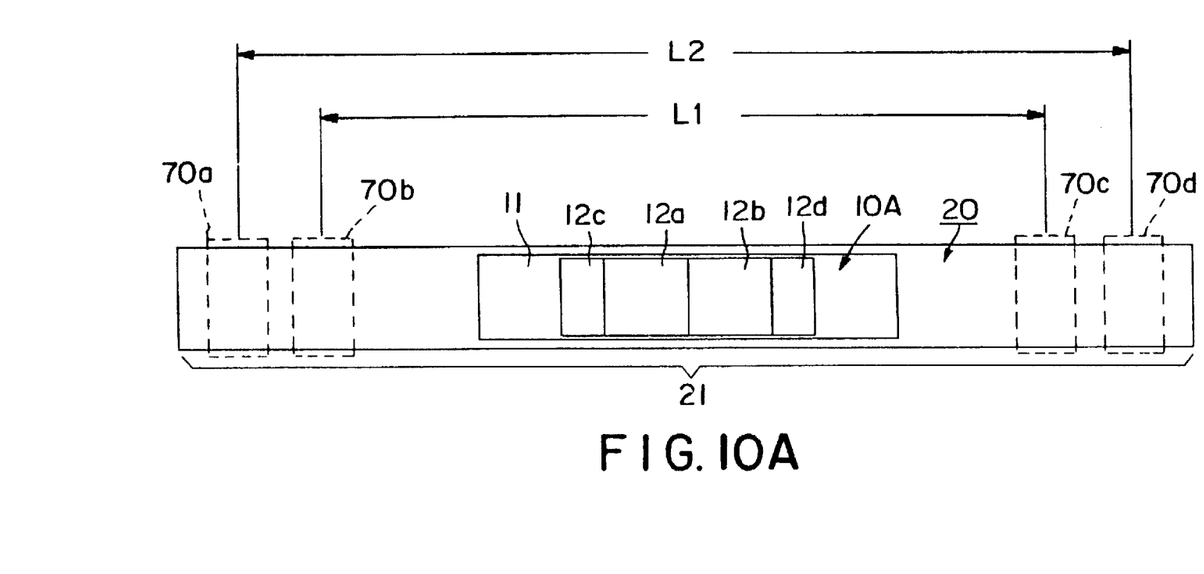
FIG. 10A is a plan view of a vibration actuator according to the fifth preferred embodiment of the present invention.
Figure 10B:
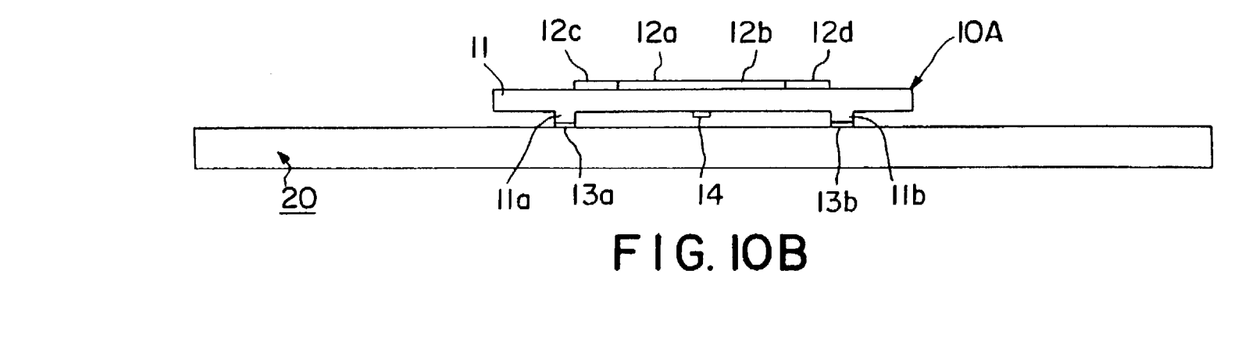
FIG. 10B is a front view of the vibration actuator of FIG. 10A.

In the examples of FIGS. 8A, 8B and 9A, 9B, and in the comparison example of FIGS. 10A, 10B, a total of four photocouplers 70a–70d are arranged with two on each side of relative moving member 20. Then, while vibration element 10A is performing 100,000 reciprocations between the two inside photocouplers 70b, 70c (pitch: L1), vibration element 10A makes 10 reciprocations between the outside photocoupters 70a, 70d (pitch: L2). After this, vibration element 10A repeatedly performs the operation of reciprocation between the inner two photocouplers 70b, 70c. In this manner, in the examples of the vibration actuators of the present invention illustrated in FIGS. 8A, 8B, and 9A, 9B, and in the comparison example of FIGS. 10A, 10B, the reversal position of the vibration element 10A, which performs reciprocating motion, is variable.

Figure 11A:
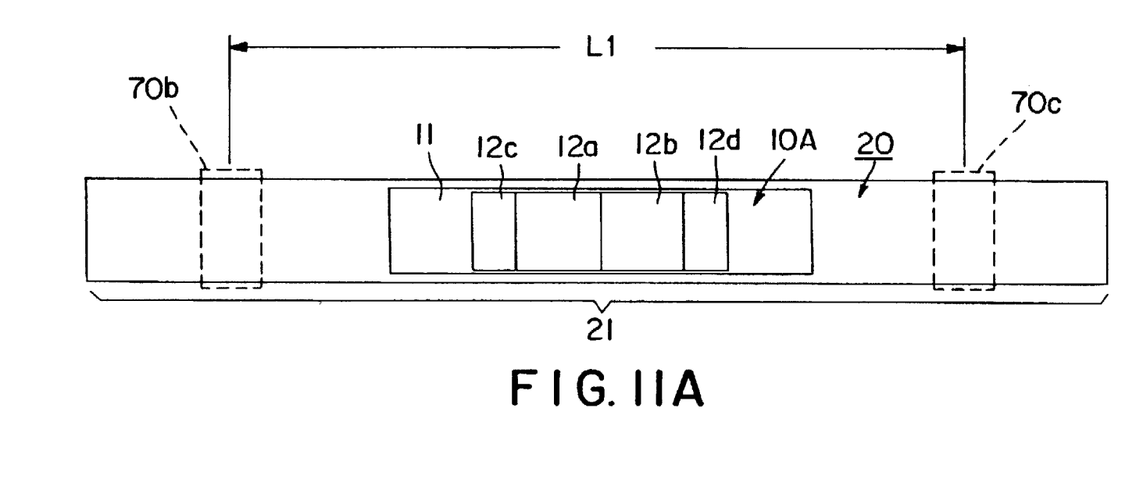
FIG. 11A is a plan view of a vibration actuator according to the fifth preferred embodiment of the present invention.
Figure 11B:
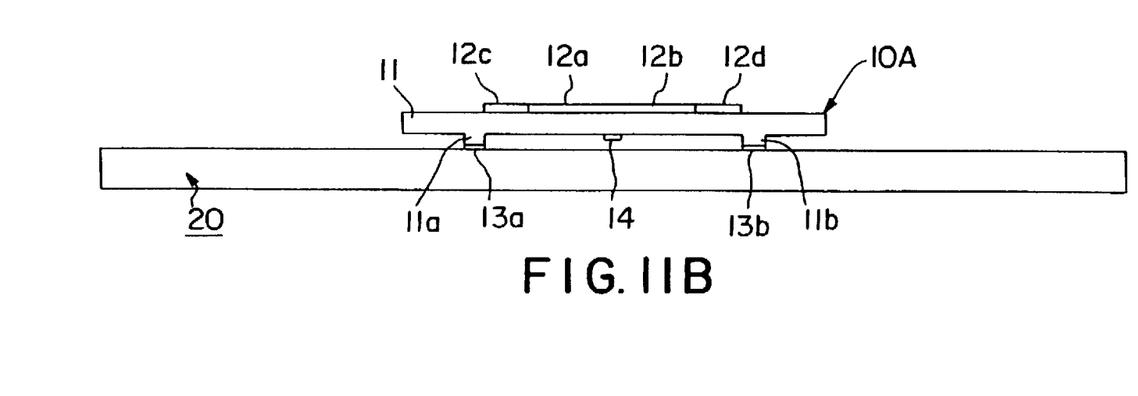
FIG. 11B is a front view of the vibration actuator of FIG. 11A.

Moreover, in the comparison example of FIGS. 11A, 11B, the vibration element is controlled by a circuit to perform repeatedly. In FIGS. 11A, 11B, vibration element 10A performs reciprocating motion between two photocouplers 70b, 70c (pitch L1). The reversal positions of the reciprocating motion which the vibration element 10A performs are fixed.

By way of the performance of such continuous operations, by measuring the number of reciprocations until the vibration element 10A is stopped by the accumulation of wear particles, endurance was observed in relation to the continuous operation of the vibration actuators. The results were: for FIGS. 8A, 8B, 15 million reciprocations, and for FIGS. 9A, 9B, 10 million reciprocations. In contrast, for FIGS. 10A, 10B, the results were 2 million reciprocations; and for FIGS. 11A, 11B the results were 400,000 reciprocations.

From the above results, it is found that the durability of the prior art vibration actuators can be increased about 40 times in accordance with the preferred embodiments of the present invention. Namely, the preferred embodiments of the present invention described above, in spite of seemingly being a very simple constitution, are clearly very practical and useful and of great significance.

Moreover, upon comparing the examples of FIGS. 8A, 8B and the examples of the vibration actuators of FIGS. 9A, 9B, the durability was about 1.5 times greater for the example of the vibration actuator invention shown in FIGS. 8A, 8B. Thus, in the example of the vibration actuators of FIGS. 8A, 8B, wear particles accumulated equally in the high surface roughness portion 22 and centered on approximately two places within the high surface roughness portion reciprocation locations of the vibration element 10A were set by the locations where the photocouplers 70a–70d were set up).

In contrast, in the example of vibration actuators of FIGS. 9A, 9B, in the case of performing a reciprocating motion at pitch L1, the wear particles accumulated in the edge portions of mirror portion 21, and upon changing the pitch of the reciprocation to L2, the wear particles which had accumulated at the edge portions of the mirror portion 21, together with the wear particles which arose thereafter, then accumulated in the neighborhood of the locations where the photocouplers 70a, 70d were disposed.

Moreover, because the neighborhoods of the photocouplers 70b, 70c are mirror portions, wear particles trapped in fine scratches in the surface are also accumulated somewhat as a residue. Because of this, the wear particles accumulated in a biased state, and to this extent, the durability was reduced more than in the example of the vibration actuators of FIGS. 8A, 8B.

Furthermore, comparing the comparison examples among themselves, the durability of the comparison example of FIGS. 10A, 10B and the durability of the comparison example of FIGS. 11A, 11B are greatly different. Thus, by changing the amplitude of the relative motion (pitch of the reversal) with suitable timing while the vibration actuators reciprocate, the accumulated portions of wear particles are dispersed. It is thus considered that the durability of the vibration actuator is increased.

Accordingly, in accordance with preferred embodiments of the present invention, in the case that the wear particles are trapped in the rough surface roughness portions, by changing the reversal points of the relative moving member, which performs reciprocating motion with respect to the vibration element, the durability of the vibration actuator can be increased.

As shown above, the vibration element and the relative moving member for the vibration actuator perform a reciprocating motion. In the contact surface at least of the vibration element and the relative moving member, an adherent material elimination region is formed to eliminate adherent material which has adhered to this contact surface. The effect is that the vibration element can drive at a high efficiency for long periods of time.

Furthermore, by forming this adherent material elimination region by sand polishing, adherent material can be efficiently eliminated from the contact surface.

Moreover, by making the reversal point of the vibration member (or relative moving member) which performs reciprocating motion, variable, the life of the vibration actuator can be increased.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A vibration actuator, comprising:
   a vibration element having a drive surface and vibrating in response to an input signal; and
   a relative moving member in compressive contact with said vibration element and having a contact surface including a first portion disposed between two second portions which differ in roughness from the first portion, wherein the drive surface removes adherent material during reciprocating motion between at least one of the second portions and the first portion in response to the vibration.

2. The vibration actuator according to claim 1, wherein said vibration element moves with reciprocation about a pair of variable reversal positions of said relative moving member.

3. The vibration actuator according to claim 2, wherein the pair of said reversal positions vary with respect to a number of reciprocating motions of said vibration element.

4. The vibration actuator according to claim 1, wherein at least one of the second portions is a polished surface.

5. The vibration actuator according to claim 4, wherein at least one of the second portions is polished with sand.

6. A vibration actuator, comprising:
   a vibration element which vibrates in response to an input voltage and includes first and second elastic members, each shaped as a semicylindrical tubular body and each having a respective drive surface, and includes an electro-mechanical conversion element sandwiched between the first and second elastic members; and
   a relative moving member in compressive contact with said vibration element at a contact surface and moving relative to said vibration element in response to the vibration generated in said vibration element,
   wherein a drive surface of the first elastic member has a first portion and has a second portion which differs in surface roughness from the first portion to remove an adherent material from the contact surface, and the contact surface contacts the first portion and the second portion successively during the relative movement.

7. The vibration actuator according to claim 6, wherein the second portion is a surface which laps the contact surface.

8. A vibration actuator, comprising:
   an elastic member having a first planar side, a second planar side and a driving force output portion disposed on the second planar side;
   an electro-mechanical conversion element attached to the first planar side and inducing vibration in said elastic member; and
   a relative moving member in compressive contact with the driving force output portion, said relative moving member including:
      a first portion, and
      a second portion connected to the first portion which differs in roughness from the first portion to remove adherent material from the driving force output portion,
   wherein the driving force output portion moves from the first portion to the second portion while maintaining contact with said relative moving member, and connection of the second portion to the first portion is non-perpendicular with respect to a trajectory of movement of the driving force output portion with respect to said relative moving member.

9. The vibration actuator according to claim 8, wherein said driving force output portion consists of a first output portion and a second output portion, and
   said relative moving member has two second portions and one first portion which is disposed between the two second portions; and
   said first driving force output portion moves from the first portion to one of the second portions and said second driving force output portion moves from the first portion to the other of the second portions while maintaining contact with said relative moving member.

10. The vibration actuator according to claim 8, wherein said relative moving member has two second portions and three first portions disposed in line with the trajectory of movement of the driving force output portion with respect to said relative moving member, with the first portions and the second portions disposed alternately.

11. A vibration actuator, comprising:
   an elastic member having a first planar side, a second planar side and a driving force output portion disposed on the second planar side;
   an electro-mechanical conversion element attached to the first planar side and inducing vibration in said elastic member; and
   a relative moving member in compressive contact with the driving force output portion, said relative moving member including a first portion disposed between two second portions which differ in roughness from the first portion to remove adherent material from the driving force output portion,
   wherein the driving force output portion consists of a first driving force output portion and a second driving force output portion, and
   wherein said first driving force output portion moves from the first portion to one of the second portions and said second driving force output portion moves from the first portion to the other of the second portions while maintaining contact with said relative moving member.

12. A vibration actuator, comprising:

an elastic member having a first planar side, a second planar side and a driving force output portion disposed on the second planar side;

an electro-mechanical conversion element attached to the first planar side and inducing vibration in said elastic member; and a relative moving member in compressive contact with the driving force output portion, said relative moving member including:

a first portion, and a second portion connected to the first portion which differs in roughness from the first portion to remove adherent material from the driving force output portion, wherein the relative moving member has a generally circular periphery which is directed radially outward from a rotational axis such that the first portion connects to opposite sides of the second portion, and the relative moving member rotates about the rotational axis by the vibration induced in said elastic member.

* * * * *